United States Patent
Avinash

(10) Patent No.: US 7,020,343 B1
(45) Date of Patent: *Mar. 28, 2006

(54) METHOD AND APPARATUS FOR ENHANCING DISCRETE PIXEL IMAGES BY ANALYZING IMAGE STRUCTURE

(75) Inventor: Gopal B. Avinash, New Berlin, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/476,684

(22) Filed: Dec. 30, 1999

(51) Int. Cl.
*G06K 9/40* (2006.01)

(52) U.S. Cl. ............... 382/254; 382/266; 382/172; 382/190; 382/309

(58) Field of Classification Search ............ 382/128, 382/309, 190, 195, 205, 260, 261, 262, 263, 382/264, 270, 271, 272, 273, 274, 254, 266, 382/172
See application file for complete search history.

(56) References Cited

U.S. PATENT DOCUMENTS

| | | | | |
|---|---|---|---|---|
| 4,747,150 A | | 5/1988 | Knutsson et al. | ........... 382/197 |
| 4,747,151 A | | 5/1988 | Knutsson et al. | ........... 382/199 |
| 4,747,152 A | | 5/1988 | Knutsson et al. | ........... 382/197 |
| 5,218,649 A | | 6/1993 | Kundu et al. | ............ 382/180 |
| 5,602,934 A | * | 2/1997 | Li et al. | ................ 382/128 |
| 5,900,732 A | * | 5/1999 | Felmlee et al. | ........... 324/309 |
| 6,166,545 A | * | 12/2000 | Polzin et al. | ............... 324/309 |
| 6,173,083 B1 | * | 1/2001 | Avinash | .................. 382/260 |
| 6,208,763 B1 | * | 3/2001 | Avinash | .................. 382/254 |
| 6,571,020 B1 | * | 5/2003 | Dumoulin et al. | ......... 382/254 |

OTHER PUBLICATIONS

Noll et al, "Homodyne Detection in Magnetic Resonance Imaging", Jun. 1991, IEEE Transaction on Medical Imaging, vol. 10, No. 2, pp. 154-163.*

Gonzalez, Rafael C., Digital Image Processing, pp. 197-201, 1992.

Tekalp, A. Murat, Digital Video Processing, pp. 269-270, 1995.

* cited by examiner

*Primary Examiner*—Samir Ahmed
(74) *Attorney, Agent, or Firm*—Fletcher Yoder

(57) ABSTRACT

A technique for enhancing discrete pixel images includes blurring or smoothing image data, and identifying structural features based upon the blurred image data. Identification of structural pixels is based upon a scaling factor which may be adjusted by an operator, providing an image enhancement framework which may be easily adapted to various types of images and image acquisition systems. Orientation smoothing of the structure may include dominant orientation smoothing based upon both a dominant orientation for each structural pixel, as well as the orientation orthogonal to the dominant orientation. Orientation sharpening is performed based upon whether structural pixel values exceed a desired threshold. The resulting technique is versatile and provides improved robustness to noise, while offering excellent enhancement of structure of interest in the reconstructed image without loss of texture.

39 Claims, 11 Drawing Sheets

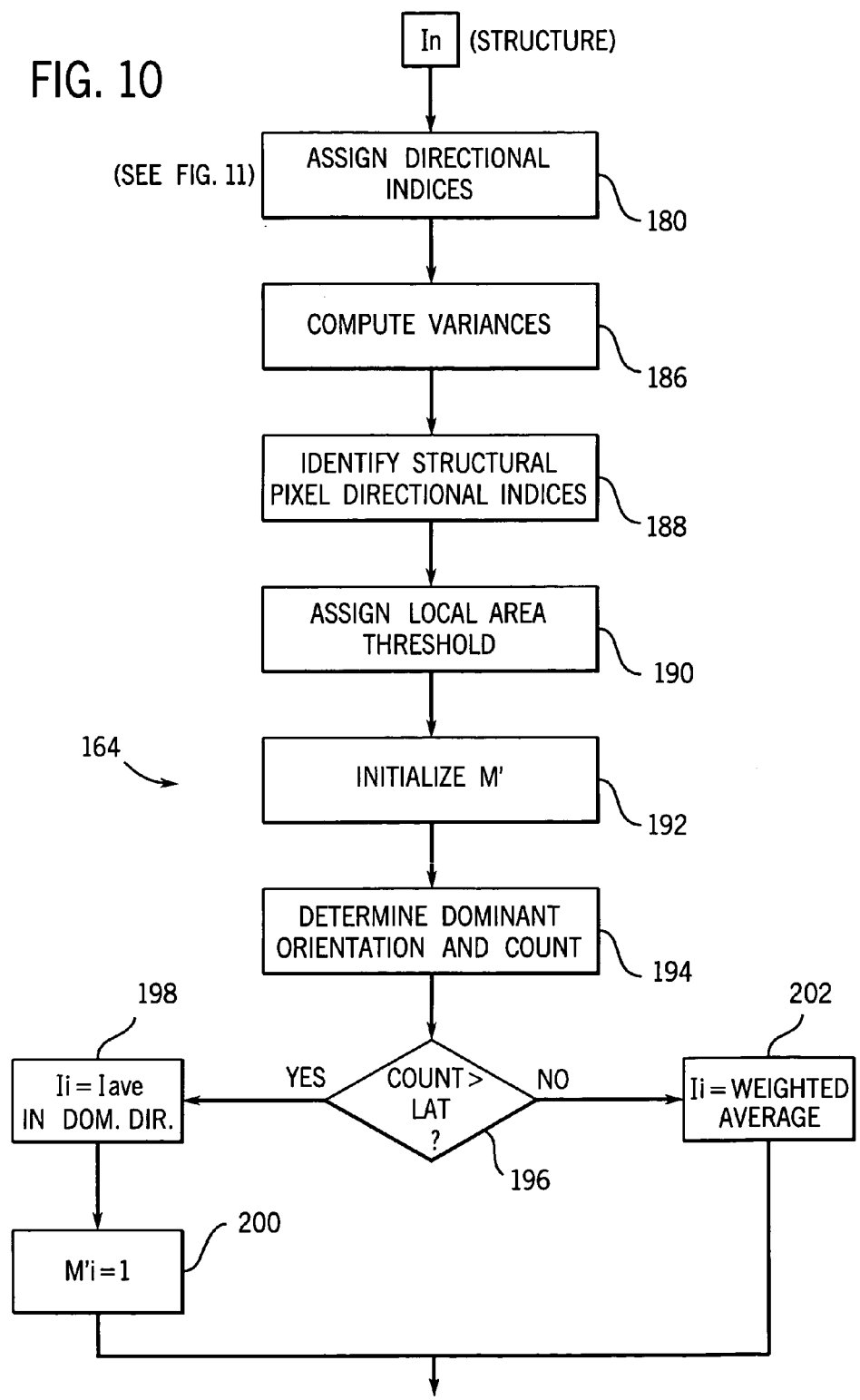

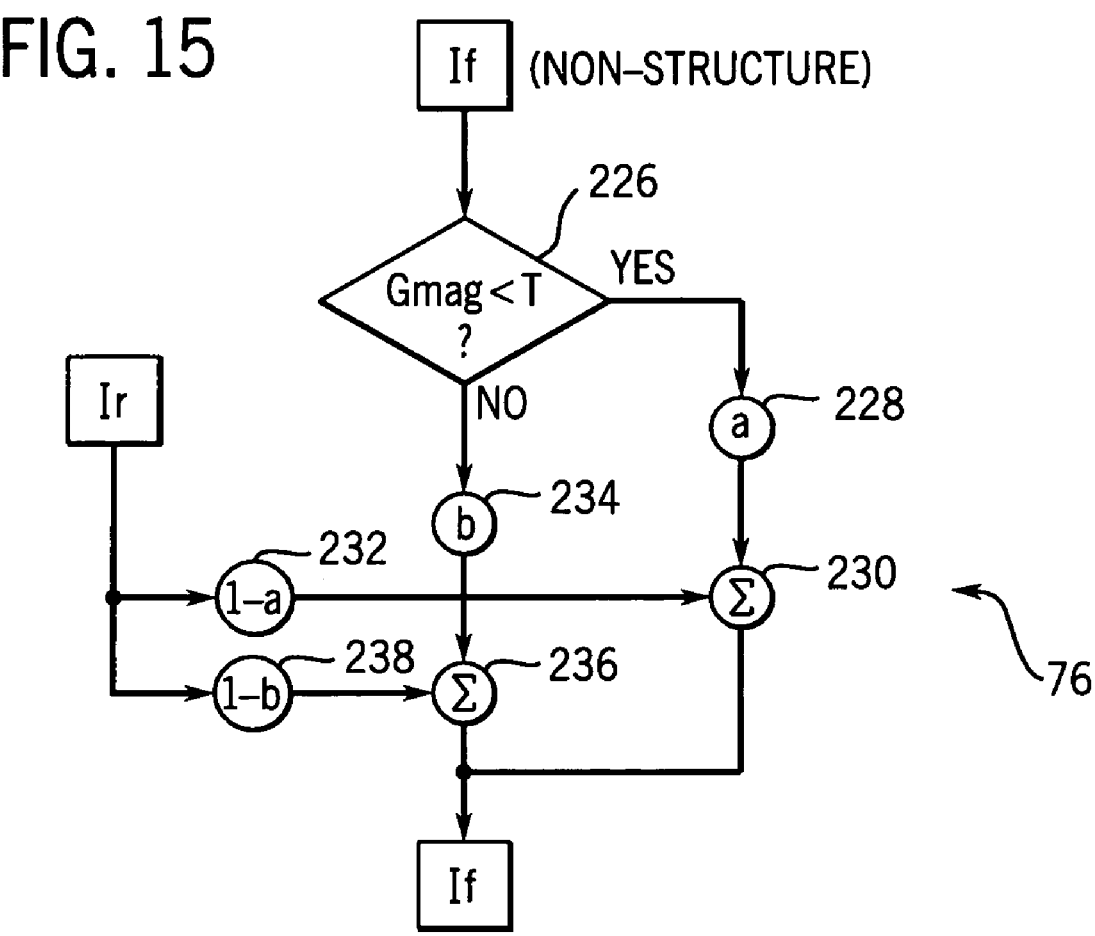

METHOD AND APPARATUS FOR ENHANCING DISCRETE PIXEL IMAGES BY ANALYZING IMAGE STRUCTURE

FIELD OF THE INVENTION

This invention relates to discrete picture element or pixel imaging techniques, and, more particularly, to an improved technique for analyzing and modifying signals or values representative of pixels in such images to provide a more readily understandable overall image in a computationally efficient manner.

BACKGROUND OF THE INVENTION

A variety of discrete pixel imaging techniques are known and are presently in use. In general, such techniques rely on the collection or acquisition of data representative of each discrete pixel composing an image matrix. In the medical imaging field, for example, several modalities are available for producing the data represented by the pixels, including magnetic resonance techniques, X-ray techniques, and so forth. Depending upon the particular modality employed, the pixel data is detected and encoded, such as in the form of digital values. The values are linked to particular relative locations of the pixels in the reconstructed image.

The utility of a processed image is often largely dependent upon the degree to which it can be interpreted by users. For example, in the field of medical diagnostics imaging, MRI, X-ray, and other images are most useful when they can be easily understood and compared by an attending physician or radiologist. Moreover, while a number of image processing parameters may control the final image presentation, it is often difficult to determine which of these parameters, or in what combination the parameters may be adjusted to provide the optimal image presentation. Often, the image processing techniques must be adjusted in accordance with empirical feedback from the physician.

The facility with which a reconstructed discrete pixel image may be interpreted by an observer may rely upon intuitive factors of which the observer may not be consciously aware. For example, a physician or radiologist may seek specific structures or specific features in an image. In medical imaging, such features might include bone, soft tissue or fluids. Such structures may be physically defined in the image by contiguous edges, contrast, texture, and so forth. The presentation of such features often depends heavily upon the particular image processing technique employed for converting the detected values representative of each pixel to modified values used in the final image. The signal processing technique employed can therefore greatly affect the ability of the observer to visualize salient features of interest. Ideally, the technique should carefully maintain recognizable structures of interest, as well as abnormal or unusual structures, while providing adequate textural and contrast information for interpretation of these structures and surrounding background.

Known signal processing systems for enhancing discrete pixel images suffer from certain drawbacks. For example, such systems may not consistently provide comparable image presentations in which salient features or structures may be easily visualized. Differences in the reconstructed images may result from particularities of individual scanners and circuitry, as well as from variations in the detected parameters (e.g. molecular excitation or received radiation). Differences can also result from the size, composition and position of a subject being scanned. Signal processing techniques employed in known systems are often difficult to reconfigure or adjust, owing to the relative inflexibility of hardware or firmware devices in which they are implemented or to the coding approach employed in software. Finally, known signal processing techniques often employ computational algorithms which are not particularly efficient, resulting in delays in formulation of the reconstituted image or under-utilization of signal processing capabilities.

Moreover, certain known techniques for image enhancement may offer excellent results for certain systems, but may not be as suitable for others. For example, low, medium and high field MRI systems may require substantially different data processing due to the different nature of the data defining the resulting images. In current techniques completely different image enhancement frameworks are employed in such cases. In addition, current techniques may result in highlighting of small, isolated area which are not important for interpretation and may be distracting to the viewer. Conversely, in techniques enhancing images by feature structure recognition, breaks or discontinuities may be created between separate structural portions, such as along edges. Such techniques may provide some degree of smoothing or edge enhancement, but may not provide satisfactory retention of textures at ends of edges or lines.

There is a need, therefore, for an improved technique for enhancing discrete pixel images which addresses these concerns.

SUMMARY OF THE INVENTION

The invention provides an improved technique for enhancing discrete pixel images designed to respond to the concerns outlined above. The technique provides for identification of salient structures within the image, and for identification of pixels representative of such structures. In an exemplary embodiment, the structure identification begins with a blurred or smoothed image to render the structural details more robust and less susceptible to noise. The identification of structural regions may be based upon a scaled threshold, making the enhancement framework inherently applicable to a range of image types and data characteristics. While small, isolated regions may be filtered out of the image, certain of these may be recuperated to maintain edge and feature continuity.

Following identification of the structures, portions of the image, including structural and non-structural regions are smoothed. Structural regions may be smoothed to enhance structural features in dominant orientations, which may be identified to provide consistency both along and across structures. Non-structural regions may be homogenized to provide an understandable background for the salient structures. The structures may be further sharpened, and minute regions may be identified which are considered representative of noise. Such artifacts may be smoothed, removed or selectively sharpened based upon a predetermined threshold value. Original texture may be added back to non-structural regions to further facilitate interpretation of both the non-structural and structural features. The technique is particularly useful in magnetic resonance imaging systems, but may be employed over a wide range of modalities.

BRIEF DESCRIPTION OF THE DRAWINGS

FIG. 10 is a flow chart illustrating steps in exemplary control logic for performing dominant orientation smoothing in the process summarized in FIG. 9;

FIG. 15 is a flow chart illustrating steps in exemplary control logic for reintroducing certain textural features of non-structural regions in a discrete pixel image.

DETAILED DESCRIPTION OF THE INVENTION

Figure 1:
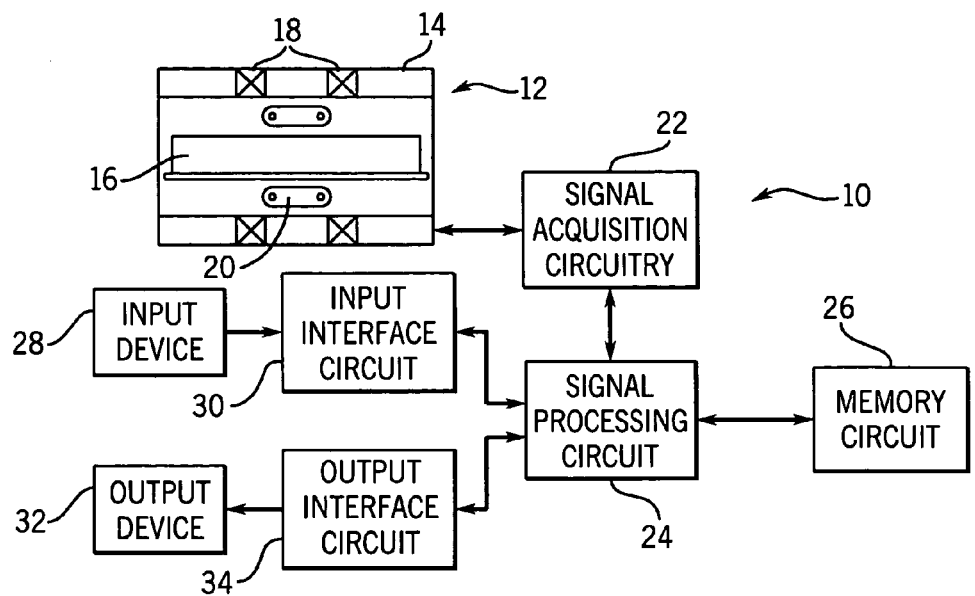
FIG. 1 is a diagrammatical representation of a magnetic resonance imaging system adapted to enhance discrete pixel images of a subject.

Referring to FIG. 1, a magnetic resonance imaging system 10 is illustrated as including a scanner 12 coupled to circuitry for acquiring and processing discrete pixel data. Scanner 12 includes a support structure 14 in which a subject 16 may be placed for acquiring images representative of internal features, such as tissues, fluids and so forth. Scanner 12 includes an electromagnet arrangement 18 for producing an electromagnetic field in a manner generally known in the art. Excitation and sensing coils 20 are provided within scanner 12 for exciting gyromagnetic materials within subject 16 and for sensing emissions from the materials.

Signals sensed by coils 20 are encoded to provide digital values representative of the excitation signals emitted at specific locations within the subject, and are transmitted to signal acquisition circuitry 22. Signal acquisition circuitry 22 also provides control signals for configuration and coordination of fields emitted by coils 20 during specific image acquisition sequences. Signal acquisition circuitry 22 transmits the encoded image signals to a signal processing circuit 24. Signal processing circuit 24 executes pre-established control logic routines stored within a memory circuit 26 to filter and condition the signals received from signal acquisition circuitry 22 to provide digital values representative of each pixel in the acquired image. These values are then stored in memory circuit 26 for subsequent processing and display.

Signal processing circuit 24 receives configuration and control commands from an input device 28 via an input interface circuit 30. Input device 28 will typically include an operator's station and keyboard for selectively inputting configuration parameters and for commanding specific image acquisition sequences. Signal processing circuit 24 is also coupled to an output device 32 via an output interface circuit 34. Output device 32 will typically include a monitor or printer for generating reconstituted images based upon the image enhancement processing carried out by circuit 24.

It should be noted that, while in the present discussion reference is made to discrete pixel images generated by a magnetic resonance imaging system, the signal processing techniques described herein are not limited to any particular imaging modality. Accordingly, these techniques may also be applied to image data acquired by X-ray systems, PET systems, and computer tomography systems, among others. It should also be noted that in the embodiment described, signal processing circuit 24, memory circuit 26, and input and output interface circuits 30 and 34 are included in a programmed digital computer. However, circuitry for carrying out the techniques described herein may be configured as appropriate coding in application-specific microprocessors, analog circuitry, or a combination of digital and analog circuitry.

Figure 2:
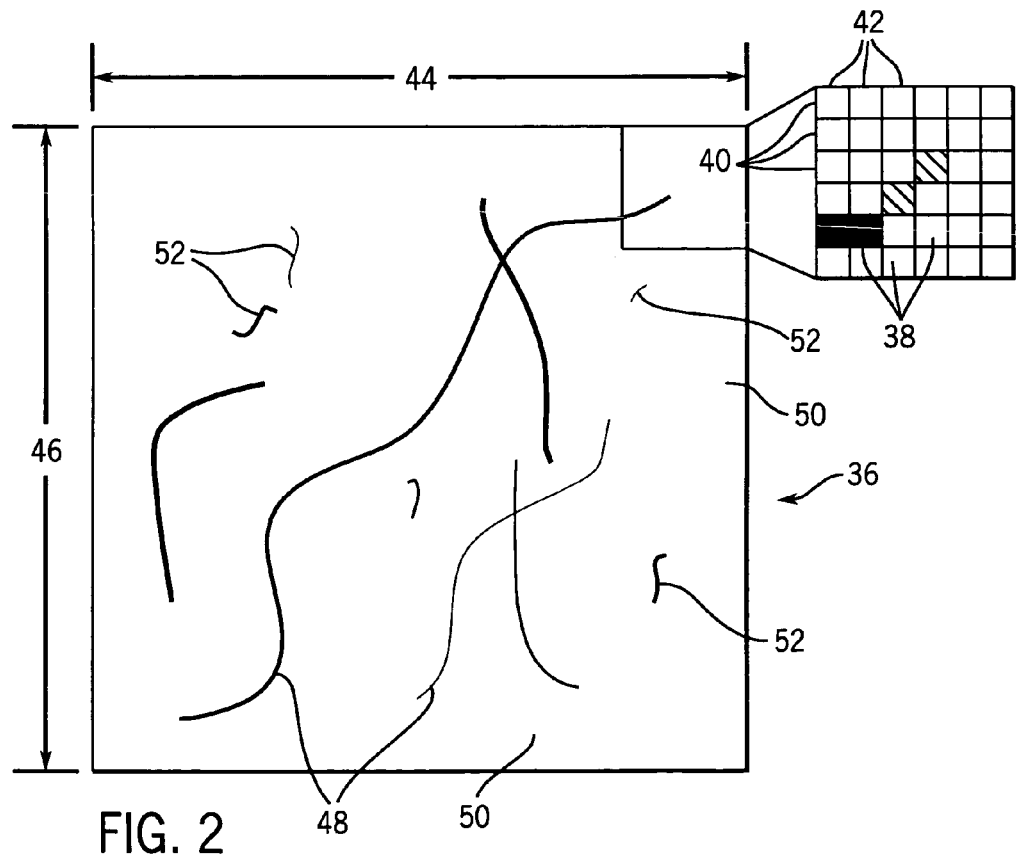
FIG. 2 is a diagram of an exemplary discrete pixel image made up of a matrix of pixels having varying intensities defining structures and non-structures.

FIG. 2 illustrates an exemplary discrete pixel image 36 produced via system 10. Image 36 is composed of a matrix of discrete pixels 38 disposed adjacent to one another in a series of rows 40 and columns 42. These rows and columns of pixels provide a pre-established matrix width 44 and matrix height 46. Typical matrix dimensions may include 256×256 pixels; 512×512 pixels; 1,024×1,024 pixels, and so forth. The particular image matrix size may be selected via input device 28 (see FIG. 1) and may vary depending upon such factors as the subject to the imaged and the resolution desired.

As illustrated in FIG. 2, image 36 includes structural regions 48, illustrated as consisting of long, contiguous lines defined by adjacent pixels. Image 36 also includes non-structural regions 50 lying outside of structural regions 48. Image 36 may also include isolated artifacts 52 of various sizes (i.e., number of adjacent pixels), which may be defined as structural regions, or which may be eliminated from the definition of structure in accordance with the techniques described below.

Figure 3:
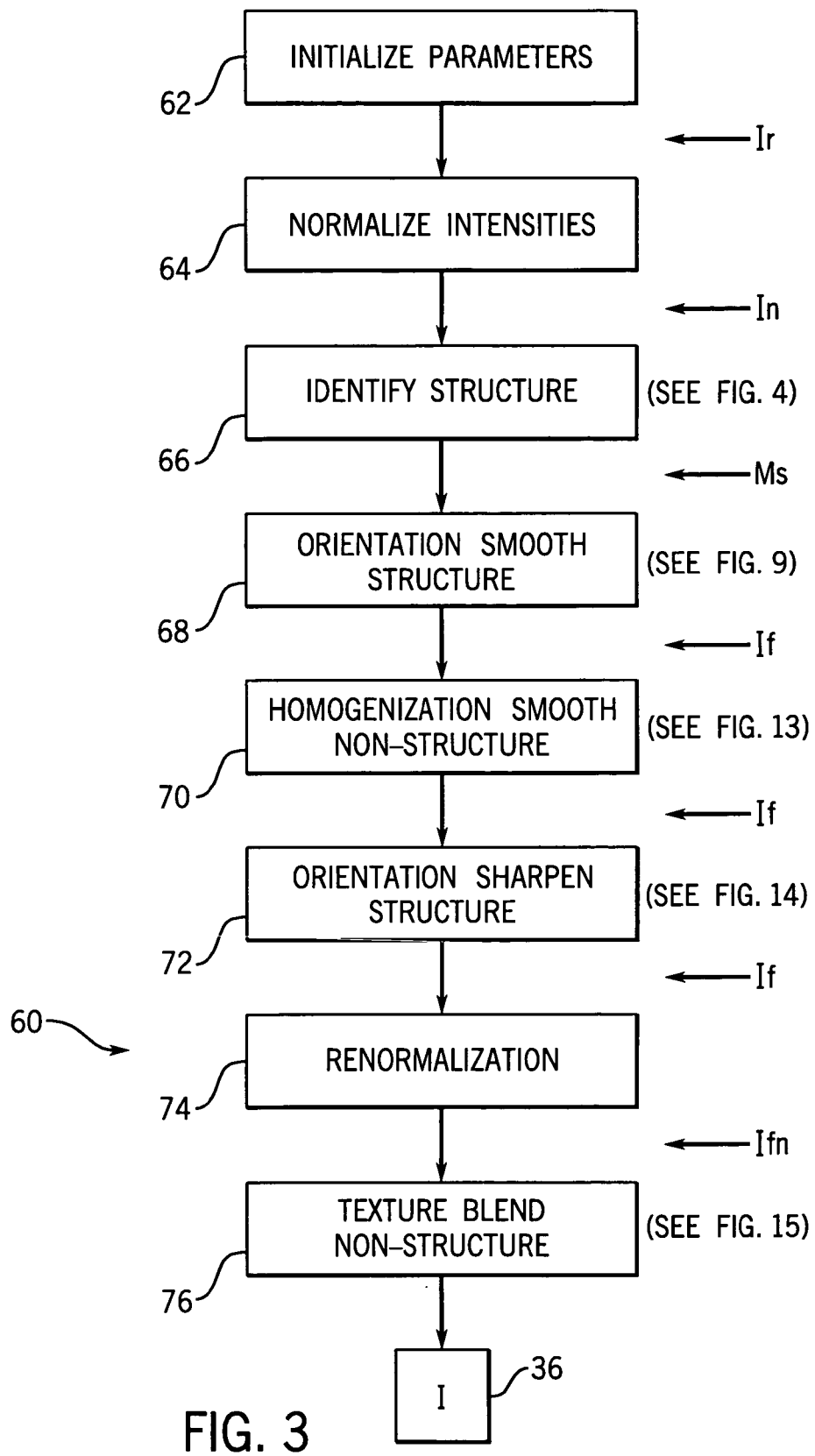
FIG. 3 is a flow chart illustrating steps in exemplary control logic for processing a discrete pixel image for identification of structures, and for enhancement of both structural and non-structural regions in the image.

Structural regions 48 and non-structural regions 50 are identified and enhanced in image 36 in accordance with control logic summarized generally in FIG. 3. This control logic is preferably implemented by signal processing circuit 24 based upon appropriate programming code stored within memory circuit 26. The control logic routine, designated generally by reference numeral 60 in FIG. 3, begins at step 62 with the initialization of parameters employed in the signal enhancement process. This initialization step includes the reading of default and operator-selected values for parameters described in the following discussion, such the size of small regions to be eliminated from structure, a "focus parameter" and so forth. Where desired, certain of these parameters may be prompted via input device 28, requiring the operator to select between several parameter choices, such as image matrix size.

At step 64, signal processing circuit 24 collects and normalizes the raw values acquired for the pixels defining the image 36. In the illustrated embodiment, this step includes reading digital values representative of intensities at each pixel, and scaling these intensities values over a desired dynamic range. For example, the maximum and minimum intensity values in the image may be determined, and used to develop a scaling factor over the full dynamic range of output device 32. Moreover, a data offset value may be added to or subtracted from each pixel value to correct for intensity shifts in the acquired data. At step 64 circuit 24 thus processes the raw image data, denoted Ir in FIG. 3, to render a normalized image In which includes pixel values filtered to span a desired portion of a dynamic range, such as 12 bits, independent of variations in the acquisition circuitry or subject.

It should be noted that while reference is made in the present discussion to intensity values within image 36, the present technique may be used to process such values or other parameters of image 36 encoded for individual pixels 38. Such parameters might include frequency or color.

At step 66, signal processing circuit 24 executes a predetermined logic routine for identifying structure 48 within image 36, as defined by data representative of the individual pixels of the image. Exemplary steps for identifying the structure in accordance with the present technique are described below with reference to FIG. 4. At step 68, the structure identified during step 66 is orientation smoothed as summarized below with reference to FIGS. 9–12. While various techniques may be employed for this orientation smoothing, in the embodiment described, dominant orientation smoothing may be carried out, which tends to bridge gaps between spans of structure, or local orientation smoothing may be employed to avoid such bridging. Step 68 is performed on the normalized image In based upon a structure mask Ms defined during step 66. Orientation smoothing carried out in step 68 thus transforms the normalized image to a filtered image If which will be further refined by subsequent processing.

The filtered image If is further processed as follows. At step 70, signal processing circuit 24 performs homogenization smoothing on non-structural regions of image 36. As described more fully below with reference to FIG. 13, this homogenization smoothing is intended to blend features of non-structural regions into the environment surrounding the structure identified at step 66. At step 72, the structure identified at step 66 is orientation sharpened. The process of orientation sharpening is described more fully below with reference to FIG. 14. At step 74 the filtered image is then renormalized based upon the intensity values after filtering and the original normalized intensity range. Finally, at step 76 texture present in non-structural regions of the image are blended back into the renormalized filtered image Ifn to provide background reference for the final image. The texture blending process is described below with reference to FIG. 15. Following step 76, the resulting pixel image values are stored in memory circuit 26 for eventual reconstruction into image 36.

Figure 4:
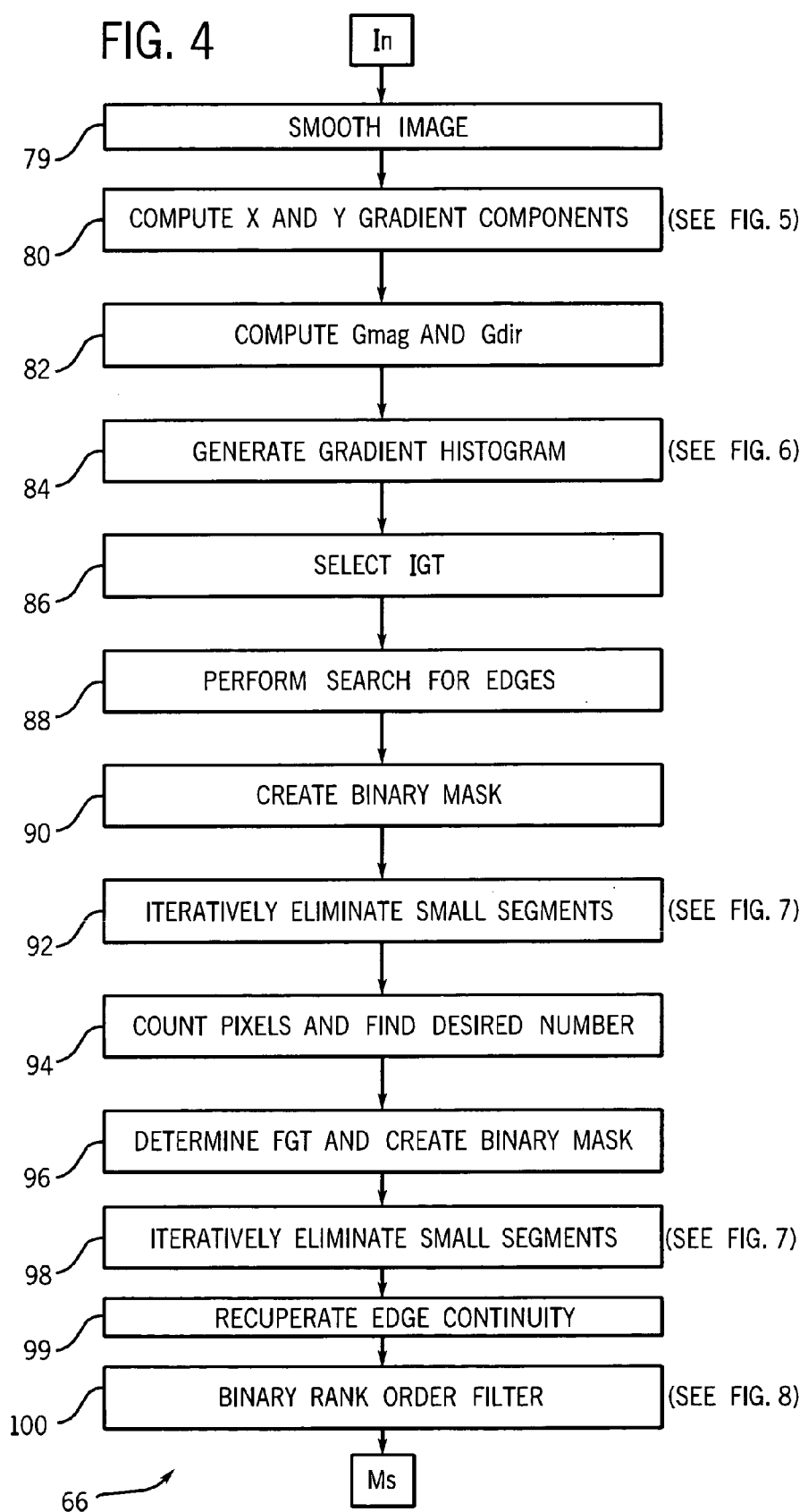
FIG. 4 is a flow chart illustrating steps in exemplary control logic for identifying structural features in a discrete pixel image.

FIG. 4 illustrates steps in control logic for identifying structural regions 48 within image 36 and for eliminating small or noisy isolated regions from the definition of the structural regions. As indicated above, the logic of FIG. 4, summarized as step 66 in FIG. 3, begins with pixel data of the normalized image In.

At step 79 a blurred or smoothed version of the normalized image is preferably formed. It has been found that by beginning the steps of FIG. 4 with this smoothed image, structural components of the image may be rendered more robust and less susceptible to noise. While any suitable smoothing technique may be employed at step 79, in the present embodiment, a box-car smoothing technique is used, wherein a box-car filter smoothes the image by averaging the value of each pixel with values of neighboring pixels. As will be appreciated by those skilled in the art, computationally efficient method for such filtering may be implemented, such as employing a separable kernel (3 or 5 pixels in length) which is moved horizontally and vertically along the image until each pixel has been processed.

Figure 5:
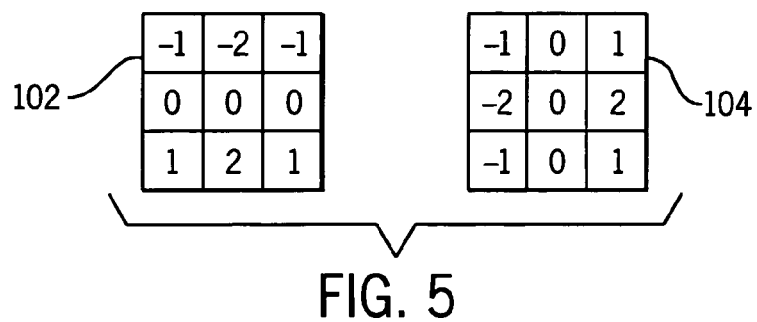
FIG. 5 is a diagram of elements or modules used in the steps of FIG. 4 for generating gradient components for each discrete pixel of the image.

At step 80, X and Y gradient components for each pixel are computed based upon the smoothed version of the normalized image. While several techniques may be employed for this purpose, in the presently preferred embodiment, 3×3 Sobel modules or operators 102 and 104 illustrated in FIG. 5, are employed. As will be appreciated by those skilled in the art, module 102 is used for identifying the X gradient component, while module 104 is used for identifying the Y gradient component of each pixel. In this process, modules 102 and 104 are superimposed over the individual pixel of interest, with the pixel of interest situated at the central position of the 3×3 module. The intensity values located at the element locations within each module are multiplied by the scalar value contained in the corresponding element, and the resulting values are summed to arrive at the corresponding X and Y gradient components.

With these gradient components thus computed, at step 82 the gradient magnitude Gmag and gradient direction Gdir are computed. In the presently preferred technique, the gradient magnitude for each pixel is equal to the higher of the absolute values of the X and Y gradient components for the respective pixel. The gradient direction is determined by finding the Arctangent of the Y component divided by the X component. For pixels having an X component equal to zero, the gradient direction is assigned a value of $\pi/2$. The values of the gradient magnitudes and gradient directions for each pixel are saved in memory circuit 26.

It should be noted that alternative techniques may be employed for identifying the X and Y gradient components and for computing the gradient magnitudes and directions. For example, those skilled in the art will recognize that in place of the Sobel gradient modules 102 and 104, other modules such as the Roberts or Prewitt operators may be employed. Moreover, the gradient magnitude may be assigned in other manners, such as a value equal to the sum of the absolute values of the X and Y gradient components.

Figure 6:
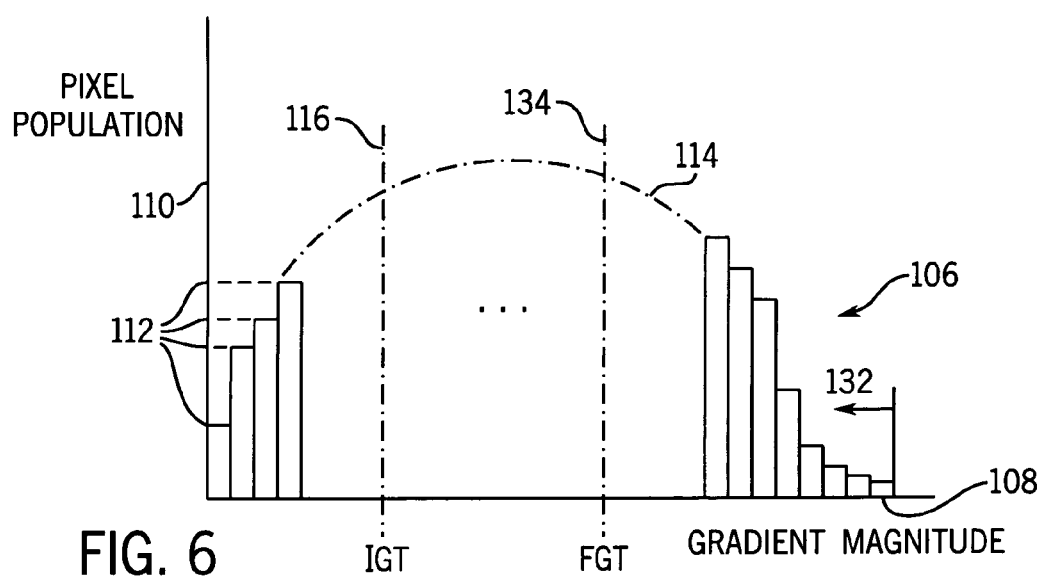
FIG. 6 is a gradient histogram of an image used to identify gradient thresholds for dividing structure from non-structural in the image.

Based upon the gradient magnitude values determined at step 82, a gradient histogram is generated as indicated at step 84. FIG. 6 illustrates an exemplary gradient histogram of this type. The histogram, designated by reference numeral 106, is a bar plot of specific populations of pixels having specific gradient values. These gradient values are indicated by positions along a horizontal axis 108, while counts of the pixel populations for each value are indicated along a vertical axis 110, with each count falling at a discrete level 112. The resulting bar graph forms a step-wise gradient distribution curve 114. Those skilled in the art will appreciate that in the actual implementation the histogram of FIG. 6 need not be represented graphically, but may be functionally determined by the signal processing circuitry operating in cooperation with values stored in memory circuitry.

Histogram 106 is used to identify a gradient threshold value for separating structural components of the image from non-structural components. The threshold value is set at a desired gradient magnitude level. Pixels having gradient magnitudes at or above the threshold value are considered to meet a first criterion for defining structure in the image, while pixels having gradient magnitudes lower than the threshold value are initially considered non-structure. The threshold value used to separate structure from non-structure is preferably set by an automatic processing or "autofocus" routine as defined below. However, it should be noted that the threshold value may also be set by operator intervention (e.g. via input device 28) or the automatic value identified through the process described below may be overridden by the operator to provide specific information in the resulting image.

As summarized in FIG. 4, the process for identification of the threshold value begins at step 86 by selecting an initial gradient threshold. This initial gradient threshold, designated 116 in FIG. 6 is conveniently set to a value corresponding to a percentile of the global pixel population, such as 30 percent. The location along axis 108 of the IGT value 116 is thus determined by adding pixel population counts from the left-hand edge of histogram 106 of FIG. 6, adjacent to axis 110 and moving toward the right (i.e., ascending in gradient values). Once the desired percentile value is reached, the corresponding gradient magnitude is the value assigned to the IGT.

At step 88, a search is performed for edges of the desired structure. The edge search proceeds by locating the pixels having gradient magnitudes greater than the IGT value selected in step 86 and considering a 5×5 pixel neighborhood surrounding the relevant pixels of interest. Within the 5×5 pixel neighborhood of each pixel of interest, pixels having gradient magnitudes above the IGT and having directions which do not differ from the direction of the pixel of interest by more than a predetermined angle are counted. In the presently preferred embodiment, an angle of 0.35 radians is used in this comparison step. If the 5×5 neighborhood count is greater than a preset number, 3 in the present embodiment, the pixel of interest is identified as a relevant edge pixel. At step 90, a binary mask image is created wherein pixels identified as relevant edge pixels in step 88 are assigned a value of 1, while all other pixels are assigned a value equal to zero.

Figure 7:
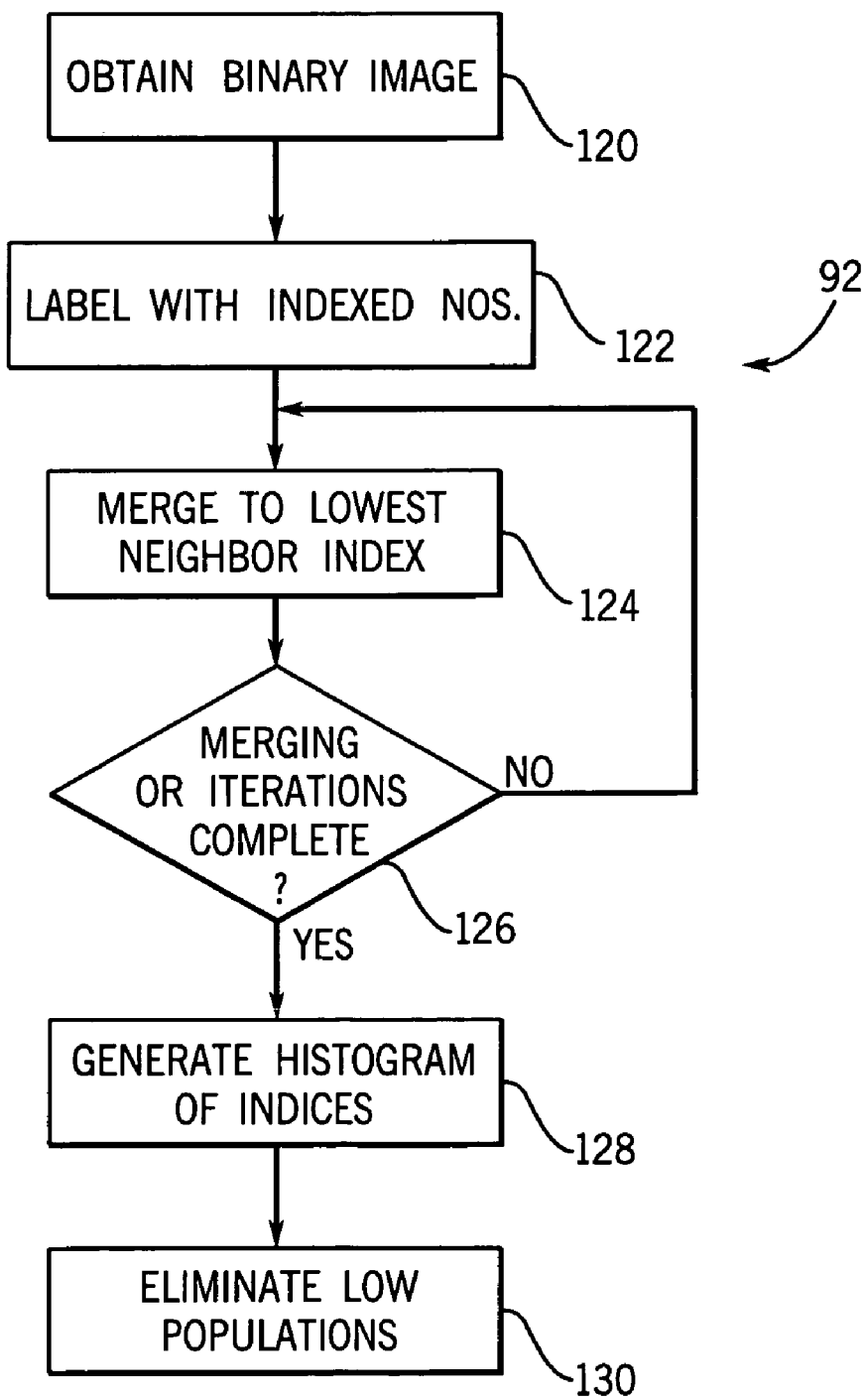
FIG. 7 is a flow chart of steps in exemplary control logic for selectively eliminating small or noisy regions from the structure definition.

At step 92 small or noisy segments identified as potential candidates for structure are iteratively eliminated. Steps in control logic for eliminating these segments are summarized in FIG. 7. Referring to FIG. 7, the process begins at step 120 where a binary image is obtained by assigning a value of 1 to pixels having a gradient magnitude value equal to or greater than a desired value, and a value of zero to all other pixels. This binary image or mask is substantially identical to that produced at step 90 (see FIG. 4). At step 122 each pixel having a value of 1 in the binary mask is assigned an index number beginning with the upper-left hand corner of the image and proceeding to the lower right. The index numbers are incremented for each pixel having a value of 1 in the mask. At step 124 the mask is analyzed row-by-row beginning in the upper left by comparing the index values of pixels within small neighborhoods. For example, when a pixel is identified having an index number, a four-connected comparison is carried out, wherein the index number of the pixel of interest is compared to index numbers, if any, for pixels immediately above, below, to the left, and to the right of the pixel of interest. The index numbers for each of the connected pixels are then changed to the lowest index number in the connected neighborhood. The search, comparison and reassignment then continues through the entire pixel matrix, resulting in regions of neighboring pixels being assigned common index numbers. In the preferred embodiment the index number merging step of 124 may be executed several times, as indicated by step 126 in FIG. 7. Each subsequent iteration is preferably performed in an opposite direction (i.e., from top-to-bottom, and from bottom-to-top).

Following the iterations accomplished through subsequent search and merger of index numbers, the index number pixel matrix will contain contiguous regions of pixels having common index numbers. As indicated at step 128 in FIG. 7, a histogram is then generated from this index matrix by counting the number of pixels having each index number appearing in the index matrix. As will be apparent to those skilled in the art, each separate contiguous region of pixels having index numbers will have a unique index number. At step 130, regions represented by index numbers having populations lower than a desired threshold are eliminated from the definition of structure as determined at step 90 of FIG. 4. In a presently preferred embodiment, regions having a pixel count lower than 50 pixels are eliminated in step 130. The number of pixels to be eliminated in this step, however, may be selected as a function of the matrix size, and the amount and size of isolated artifacts to be permitted in the definition of structure in the final image.

Returning to FIG. 4, with pixels for small segments eliminated from the binary mask created at step 90, the number of pixels remaining in the binary mask are counted as indicated at step 94. While the resulting number may be used to determine a final gradient threshold, it has been found that a convenient method for determining a final gradient threshold for the definition of structure includes the addition of a desired number of pixels to the resulting pixel count. For example, in a presently preferred embodiment a value of 4,000 is added to the binary mask count resulting from step 92 to arrive at a desired number of pixels in the image structure definition. This parameter may be set as a default value, or may be modified by an operator. In general, a higher additive value produces a sharper image, while a lower additive value produces a smoother image. This parameter, referred to in the present embodiment as the "focus parameter" may thus be varied to redefine the classification of pixels into structures and non-structures.

With the desired number of structure pixels thus identified, a final gradient threshold or FGT is determined as illustrated at step 96 in FIG. 4, based upon the histogram 106 as shown in FIG. 6. In particular, the population counts for each gradient magnitude value beginning from the right-hand edge of histogram 106 are summed moving to the left as indicated by reference number 132. Once the desired number of structural pixels is reached (i.e., the number of pixels counted at step 94 plus the focus parameter), the corresponding gradient magnitude value is identified as the final gradient threshold 134. In the presently preferred embodiment, the FGT value is then scaled by multiplication by a value which may be automatically determined or which may be set by a user. For example, a value of 1.9 may be employed for scaling the FGT, depending upon the image characteristics, the type and features of the structure viewable in the image, and so forth. The use of a scalable threshold value also enables the technique to be adapted easily and quickly to various types of images, such as for MRI data generated in systems with different field strengths, CT data, and so forth.

Based upon this scaled final gradient threshold, a new binary mask is defined by assigning pixels having values equal to or greater than the FGT a value of 1, and all other pixels a value of zero. At step 98 the resulting binary mask is filtered to eliminate small, isolated segments in a process identical to that described above with respect to step 92 and FIG. 7. However, at step 98 rather than a four-connected neighborhood, a eight-connected neighborhood (i.e., including pixels having shared edges and corners bounding the pixel of interest) is considered in the index number merger steps.

At step 99, certain of the isolated regions may be recuperated to provide continuity of edges and structures. In the present embodiment, for example, if a pixel in the gradient image is above a second gradient threshold, referred to as GFT, and is connected (i.e. immediately adjacent) to a pixel which is above the FGT, the corresponding pixel in the binary image is changed from a 0 value to a value of 1. The value of the GFT may be set to a desired percentage of the FGT, and may be determined empirically to provide the desired degree of edge and structure continuity. This gradient following step is preferably carried out recursively to determine an initial classification of the pixels.

At step 100 in FIG. 4, the feature edges identified through the previous steps, representative of candidate structures in the image, are binary rank order filtered. While various techniques may be employed for this enhancing identified candidate structures, it has been found that the binary rank order filtering provides satisfactory results in expanding and defining the appropriate width of contiguous features used to define structural elements. Steps in exemplary control logic for implementing the binary rank order filtering of step 100 are illustrated in FIG. 8.

Figure 8:
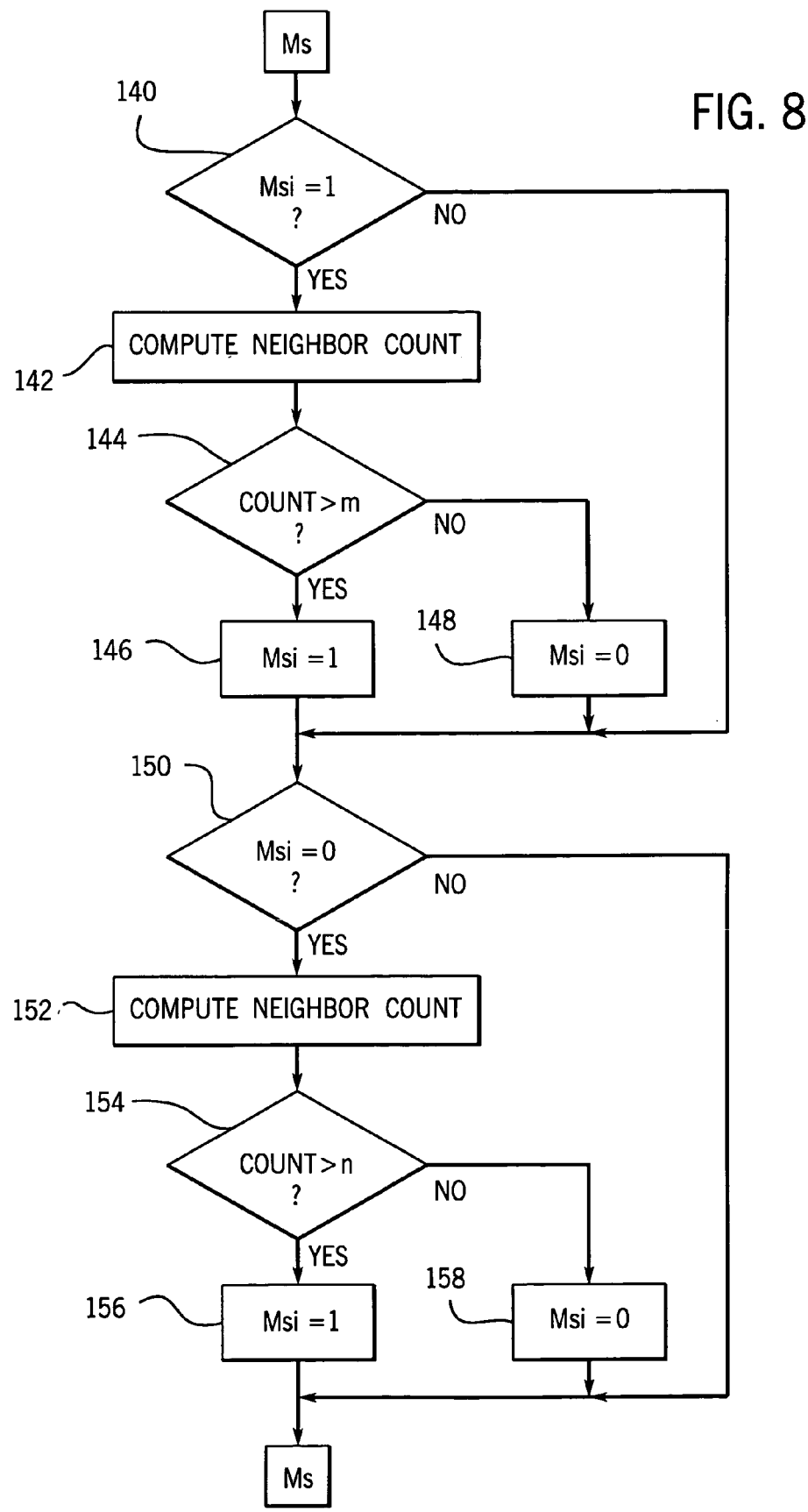
FIG. 8 is a flow chart of steps in exemplary control logic for processing structural features identified in the image by binary rank order filtering.

Referring to FIG. 8, the binary rank order filtering begins at step 140 with the binary mask generated and refined in the foregoing steps. At step 140, circuit 24 determines whether each pixel in the binary mask has a value of 1. If the pixel found to have a value of 1 in the mask, a neighborhood count is performed at step 142. In this neighborhood count, pixels in the binary mask having values of 1 are counted within a 3×3 neighborhood surrounding the structural pixel of interest. This count includes the pixel of interest. At step 144, circuit 24 determines whether the count from step 142 exceeds a desired count m. In the present embodiment, the value of m used at step 144 is 2. If the count is found to exceed the value m the value of 1 is reassigned to the pixel of interest, as indicated at step 146. If, however, the count is found not to exceed the value of m the pixel of interest is assigned the value of 0 in the mask as indicated at step 148. Following steps 146 and 148, or if the pixel is found not to have an original value of 1 in the mask at step 140, control proceeds to step 150.

At step 150, circuit 24 reviews the structure mask to determine whether each pixel of interest has a value of 0. If a pixel is located having a value of 0, circuit 24 advances to step 152 to compute a neighborhood count similar to that described above with respect to step 142. In particular, a 3×3 neighborhood around the non-structure pixel of interest is examined and a count is determined of pixels in that neighborhood having a mask value of 1. At step 154 this neighborhood count is compared to a parameter n. If the count is found to exceed the parameter n, the mask value for the pixel is changed to 1 at step 156. If the value is found not to exceed n, the mask pixel retains its 0 value as indicated at step 158. In the present embodiment, the value of n used in step 154 is 2. Following step 156 or step 158, the resulting mask Ms contains information identifying structural features of interest and non-structural regions. Specifically, pixels in the mask having a value of 1 are considered to identify structure, while pixels having a value of 0 are considered to indicate non-structure.

Figure 9:
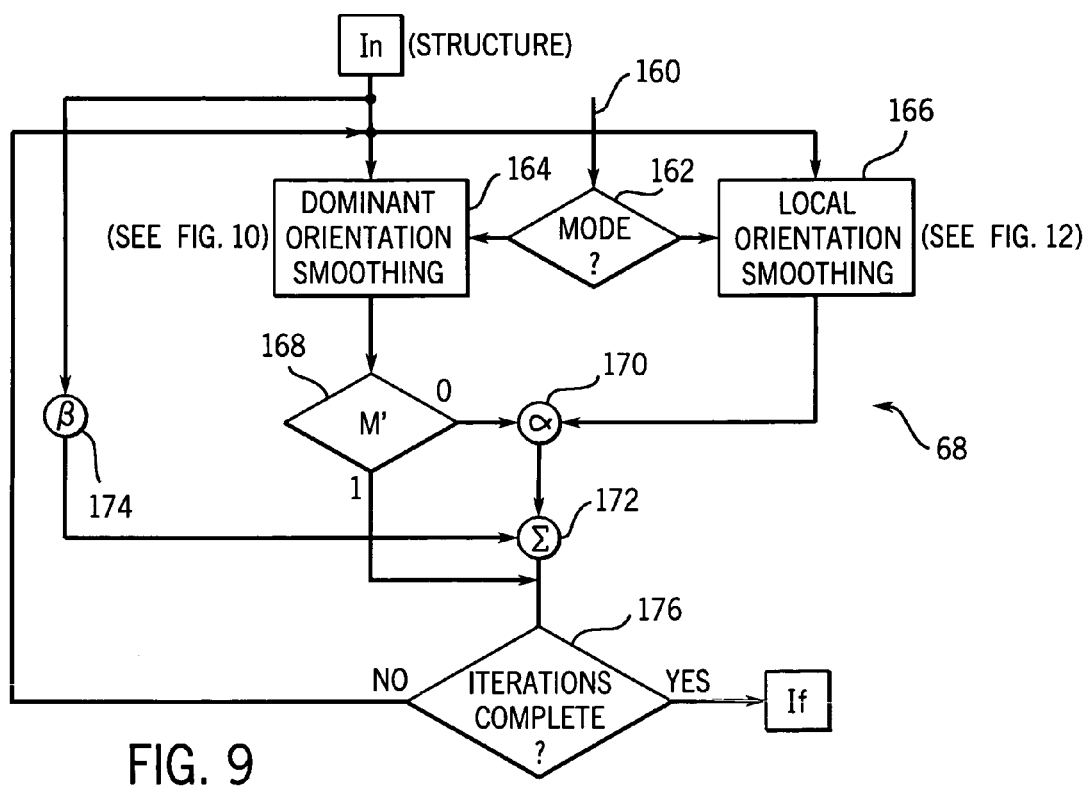
FIG. 9 is a flow chart illustrating steps in exemplary control logic for orientation smoothing of structure identified in an image.

With the structure of the image thus identified, orientation smoothing of the structure, as indicated at step 68 of FIG. 3, is carried out through logic such as that illustrated diagrammatically in FIG. 9. As shown in FIG. 9, the orientation smoothing of image structure begins with the normalized values for the corresponding structure and may proceed in different manners depending upon the type of smoothing desired. In particular, based upon an operator input designated 160 in FIG. 9, a logical decision block 162 directs signal processing circuit 24 to either dominant orientation smoothing as indicated at reference numeral 164 or local orientation smoothing as indicated at 166. If dominant orientation smoothing is selected, the intensity values for the structural pixels are processed as summarized below with respect to FIG. 10, to generate a binary mask M'. Following iterations of the procedure outlined below with reference to FIG. 10, the values of mask M' are evaluated at step 168, and smoothing is performed on the structure intensity values by use of multipliers a and β resulting in values which are then summed as indicated at blocks 170, 172 and 174 of FIG. 9 and as summarized in greater detail below.

Figure 11:
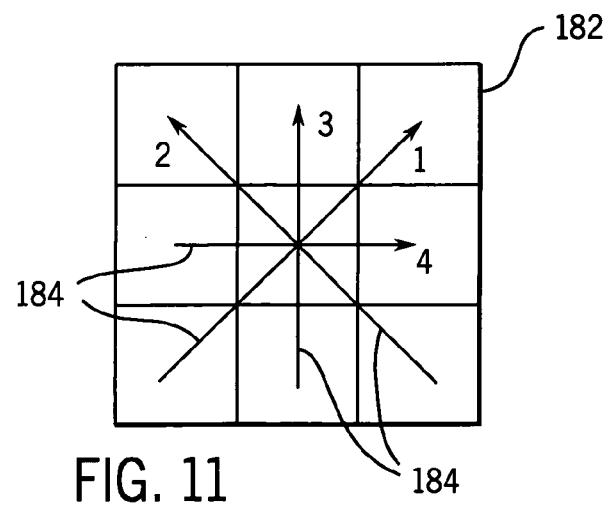
FIG. 11 is a diagram of directional indices employed in the orientation smoothing process of FIG. 10.

To explain the dominant orientation smoothing step of 164, reference is now made to FIG. 10. As illustrated in FIG. 10, the dominant orientation smoothing begins with assigning directional indices to each pixel identified as a structural pixel in the structure mask Ms. In the present embodiment, one of four directional indices is assigned to each structural pixel in accordance with the statistical variances for each pixel, as shown in FIG. 11. As illustrated in FIG. 11, within a local neighborhood 182 surrounding each structural pixel, statistical variances for pixel kernels in four directions are computed by reference to the normalized intensity values of the surrounding pixels. The direction of the minimum variance is selected from the four computed values and a corresponding directional index is assigned as indicated by reference numeral 184 in FIG. 11. In the present embodiment these directional indices are assigned as follows: "1" for 45 degrees; "2" for 135 degrees; "3" for 90 degrees; and "4" for 0 degrees. These steps are summarized as 186 and 188 in FIG. 10. At step 190 a local area threshold value is assigned based upon the image matrix size. In the present embodiment, a local area threshold of 6 is used for 256×256 pixel images, a value of 14.25 is used for 512×512 pixel images, and a value of 23 is used for 1024×1024 pixel images.

At step 192, a binary mask M' is initialized with zero values for each pixel. At step 194 a dominant orientation is established for each structural pixel by examining the directional indices set in step 188 within a local neighborhood surrounding each structural pixel. In this process, the directional indices found in the local neighborhood are counted and the pixel of interest is assigned the directional index obtaining the greatest count (or the lowest index located in the case of equal counts).

In the present embodiment, both the dominant direction and its orthogonal direction are considered to make a consistency decision in the dominant orientation smoothing operation. In terms of FIG. 11, these directions are 1 and 2, or 3 and 4. It has been found that considering such factors substantially improves the robustness of the dominant orientation determination in the sense of being consistent with the human visual system (i.e. providing reconstructed images which are intuitively satisfactory for the viewer).

The consistency decision made at step 194 may be based upon a number of criteria. In the present embodiment, the image is smoothed along the dominant direction (i.e. the direction obtaining the greatest number of counts in the neighborhood) if any one of the following criteria is met: (1) the number of counts of the orientation obtaining the greatest number is greater than a percentage (e.g. 67%) of the total neighborhood counts, and the orthogonal orientation obtains the least counts; (2) the number of counts of the orientation obtaining the maximum counts is greater than a smaller percentage than in criterion (1) (e.g. 44%) of the total neighborhood counts, and the orthogonal direction obtains the minimum number, and the ratio of the counts of the dominant direction and its orthogonal is greater than a specified scalar (e.g. 5); or (3) the ratio of the dominant direction counts to its orthogonal direction counts is greater than a desired scalar multiple (e.g. 10).

In the present embodiment, the neighborhood size used to identify the direction of dominant orientation in step 194 is different for the series of image matrix dimensions considered. In particular, a 3×3 neighborhood is used for 256×256 pixel images, a 5×5 neighborhood is used for 512×512 pixel images, and a 9×9 neighborhood is used for 1024×1024 pixel images.

At step 196, the count determined in the searched neighborhood for each pixel is compared to the local area threshold. If the count is found to exceed the local area threshold, signal processing circuit 24 advances to step 198. At that step, the intensity value for each structural pixel is set equal to the average intensity of a 1×3 kernel of pixels in the dominant direction for the pixel of interest. Subsequently, at step 200, the value of a corresponding location in the binary matrix M' is changed from 0 to 1. If at step 196, the count is found not to exceed the local area threshold for a particular pixel, the intensity value for the pixel of interest is set equal to a weighted average as indicated at step 202. This weighted average is determined by the relationship:

weighted avg=(1/(1+$p$))(input)+($p$/(1+$p$))(smoothed value);

where the input value is the value for the pixel of interest at the beginning of routine 164, p is a weighting factor between 1 and 200, and the smoothed value is the average intensity of a 1×3 kernel in the dominant direction of the pixel of interest. From either step 200 or 202, circuit 24 returns to step 168 of FIG. 9.

Referring again to FIG. 9, at step 168, the values of each pixel in the binary mask M' are evaluated. If the value is found to equal zero, the corresponding intensity value Ii is multiplied by a weighting factor $\alpha$ at step 170. In the present embodiment, factor $\alpha$ is set equal to 0.45. At block 172 the resulting value is summed with the product of the normalized intensity value for the corresponding pixel and a weighting factor $\beta$ as computed at step 174. In the present embodiment, the factors $\alpha$ and $\beta$ have a sum equal to unity, resulting in a value of $\beta$ equal to 0.55.

If at step 168 the value for a particular pixel is found to equal 1 in the binary mask M', control advances to decision block 176. Decision block 176 is also reached following the summation performed at block 172 as described above. In the present embodiment, the foregoing dominant orientation smoothing steps are performed over a desired number of iterations to provide sufficient smoothing and bridging between structural regions. At step 176, therefore, circuit 24 determines whether the desired number of iterations have been completed, and if not, returns to step 164 to further smooth the structural regions. In the present embodiment, the operator may select from 1 to 10 such iterations.

Figure 12:
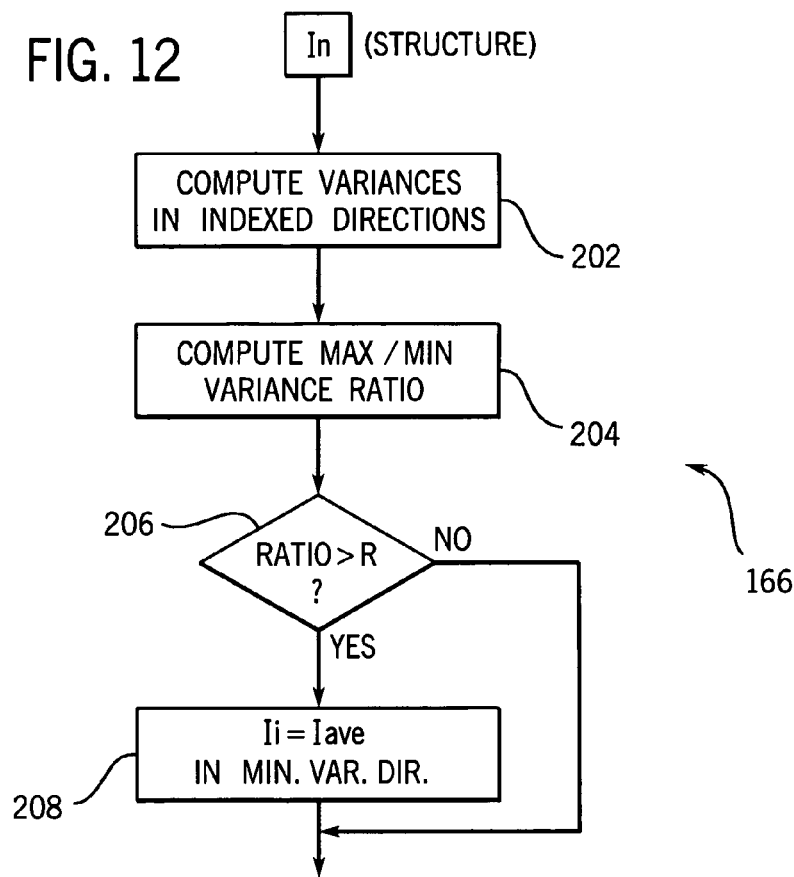
FIG. 12 is a flow chart of steps in exemplary control logic for performing local orientation smoothing through the process of FIG. 9.

As noted above, the orientation smoothing can proceed through an alternative sequence of steps for local orientation smoothing as noted at block 166 in FIG. 9. FIG. 12 illustrates exemplary steps in control logic for such local orientation smoothing. As with the dominant orientation smoothing, the local orientation smoothing begins with the normalized intensity values for the structural pixels. At step 202, statistical variances for 1×3 pixel kernels about each structural pixel are calculated for each indexed direction (see FIG. 11) as described above for the dominant orientation smoothing process. At step 204, a ratio of the maximum/minimum statistical variances identified for each pixel in step 202 is computed. At step 206 this ratio for each structural pixel is compared to a parameter R, referred to as a relaxation factor for the local orientation filtering. In the present embodiment, the value of R can be set between 1 and 200. If at step 206 the variance ratio is found to exceed R, local orientation filtering is accomplished as indicated at step 208 by setting the intensity value for the structural pixel of interest equal to an average value for the 1×3 pixel kernel in the direction of the minimum variance. If at step 206 the ratio between the maximum and minimum variances for the pixel of interest is found not to exceed R, no local orientation smoothing is performed and circuit 24 advances to a point beyond step 208. From this point, control returns to block 170 of FIG. 9.

As illustrated in FIG. 9, at block 170 the intensity value for each structural pixel is multiplied by a weighting factor $\times\alpha$, and combined at block 172 with the product of the normalized intensity value for the corresponding pixel and a weighting factor $\beta$ produced at block 174. As summarized above, at step 176, circuit 24 determines whether the desired number of iterations has been completed and, if not, returns to the local orientation smoothing block 166, to repeat the steps of FIG. 12 until the desired number of iterations is complete. Once the desired iterations have been performed, the filtered image If resulting from the orientation smoothing is further filtered by the processes described below.

Figure 13:
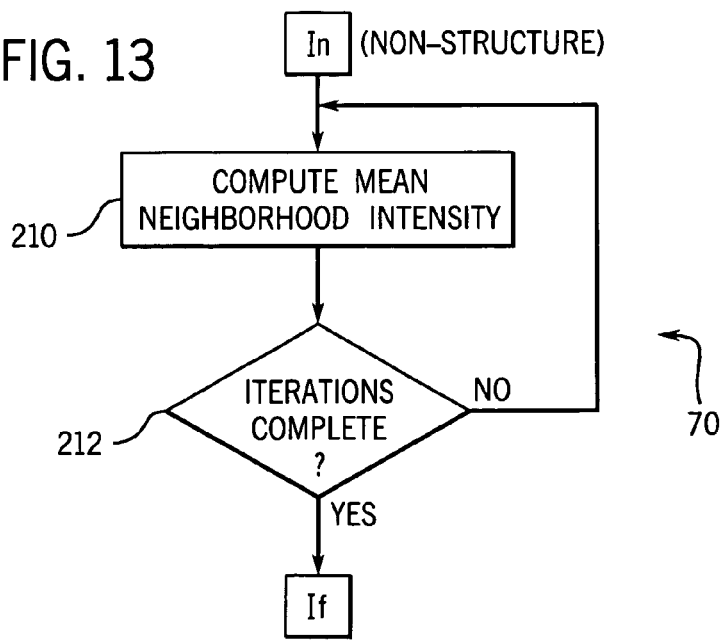
FIG. 13 is a flow chart of steps in exemplary control logic for homogenization smoothing of non-structural regions of a discrete pixel image.

As summarized above with reference to FIG. 3, following orientation smoothing of the structure identified within the image, homogenization smoothing of non-structure is performed. The steps in a process for such homogenization smoothing are summarized in FIG. 13. As shown in FIG. 13, the normalized intensity values for non-structural pixels are considered in this process. At step 210, the mean neighborhood intensity value for each non-structural pixel is computed (taking into account the normalized values of structural pixels where these are included in the neighborhood considered). In the present embodiment, step 210 proceeds on the basis of a 3×3 neighborhood surrounding each non-structural pixel. This mean value is assigned to the pixel of interest and control advances to step 212. At step 212 circuit 24 determines whether a desired number of iterations has been completed. If not, control returns to step 210 for further homogenization of the non-structural pixel intensity values. Once the desired number of iterations has been completed the homogenization smoothing routine of FIG. 13 is exited. In the present embodiment, the operator may set the number of homogenization smoothing iterations from a range of 1 to 10.

Figure 14:
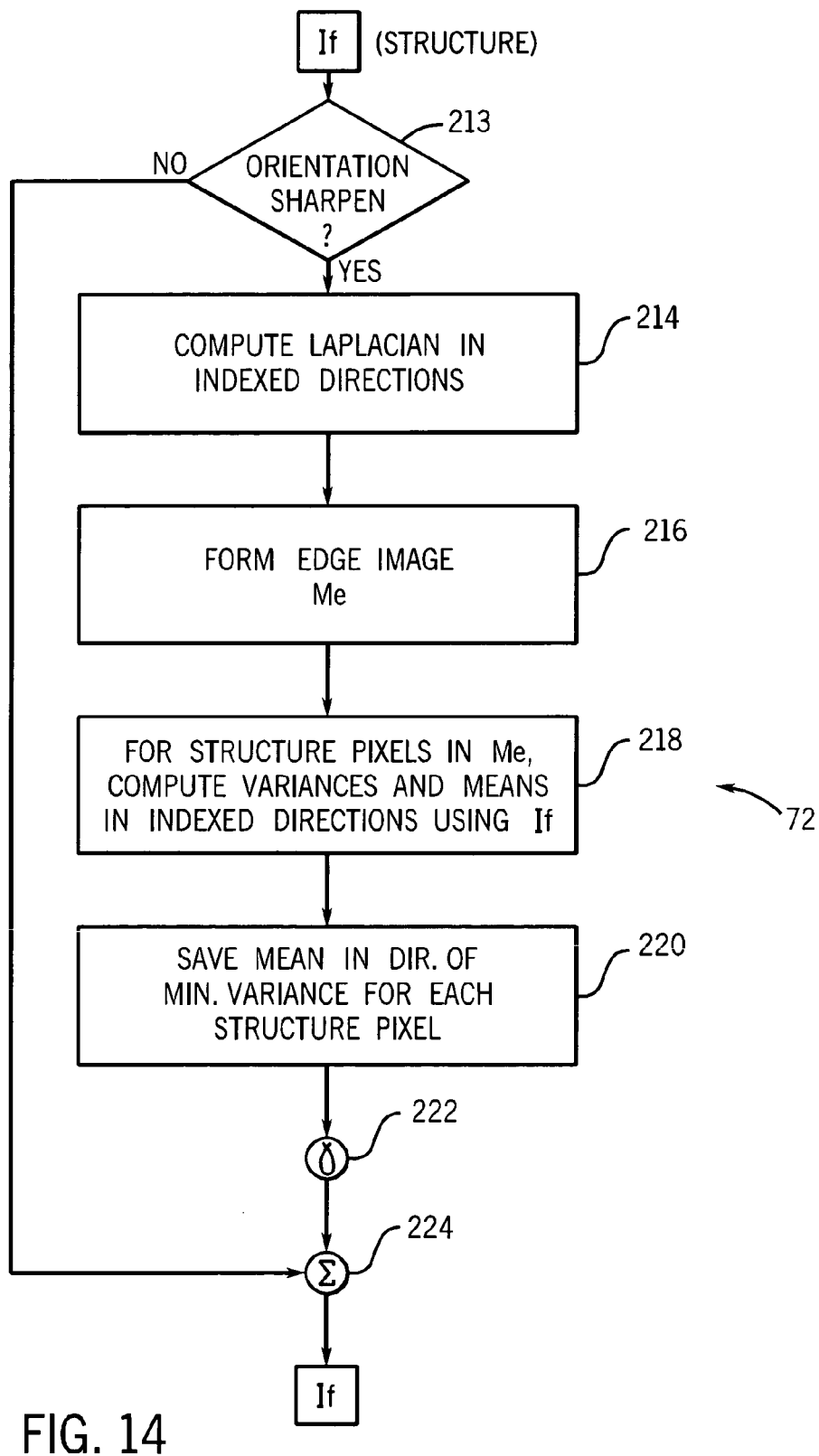
FIG. 14 is a flow chart of steps in exemplary control logic for orientation sharpening of structural regions in a discrete pixel image.

Following homogenization smoothing, the filtered image is further processed by orientation sharpening of the identified structure as mentioned above with regard to FIG. 3, and as illustrated in greater detail in FIG. 14. As shown in FIG. 14, in the present embodiment, the sharpening is performed only for pixel values which are above a preset lower limit, as indicted at decision block 213. This limit, which may be set to a multiple of the FGT (e.g. 2×FGT), thus avoids enhancement of structural pixels which should not be sharpened. If a structural pixel has a value above the limit, the orientation sharpening sequence begins at step 214 where Laplacian values for each such structural pixel are computed in the indexed directions shown in FIG. 11 and described above. The Laplacian values may be computed from the formula $$L(k)=2.0*I(k)-I(k-1)-I(k+1);$$

where k is the structural pixel of interest, "k−1" is the pixel preceding the pixel of interest in the indexed direction, and "k+1" is the pixel succeeding the pixel of interest in the indexed direction. It should be noted that the Laplacian values computed at step 214 are based upon the filtered intensity values (i.e., smoothed values for structure). At step 216, the maximum of the four Laplacian values for each structural pixel is then saved to form an edge image Me. At step 218, for each structural pixel, the statistical variances and mean values for a 3×1 pixel kernel are computed in the indexed directions shown in FIG. 11, again using the filtered (i.e., homogenized and smoothed) values for each pixel in the relevant neighborhoods. The direction of minimum variance for each structural pixel is then identified from these values, and the mean value in the direction of minimum variance is saved for each pixel as indicated at step 220. At step 222, the mean value in the direction of minimum variance for each structural pixel is multiplied by a factor γ. In the present embodiment, the value of γ may be set within a range varying from 0.00001 to 2.0. In general, the higher the value of γ selected, the greater the overall sharpness of strong edges in the final image. At step 224, the resulting weighted value is added to the initial filtered value for the corresponding structural pixel. The resulting filtered image values are then further processed as described below.

Following orientation sharpening of the structural features of the image, the entire image is again renormalized as indicated at step 74 in FIG. 3. While various methods may be used for this renormalization, in the present embodiment the global average pixel intensity in the filtered image following step 72 is computed, and a normalization factor is determined based upon the difference between this average value and the average value prior to the filtration steps described above. The new normalized intensity value for each pixel is then determined by multiplying this normalization factor by the filtered pixel intensity, and adding the global minimum intensity value from the original data to the product.

The resulting renormalized filtered image, denoted Ifn in FIG. 3, is then further processed to blend back into the non-structural regions texture from the original data. This texture blending step is summarized in FIG. 15. In general, the steps of FIG. 15 tend to add more or less original texture depending upon the gradient magnitude of the non-structural pixels. In particular, at step 226, the gradient magnitude for each non-structural pixel of interest is compared to a threshold value T. In the present embodiment, this threshold is set to a value of 300. If the gradient is found not to exceed the threshold, the pixel intensity value is multiplied by a value "a" at step 228. The resulting product is added at step 228 to the product of the raw intensity value for the pixel (prior to the normalization at step 64 of FIG. 3) multiplied by a value equal to "1−a" at step 232. The resulting weighted average is assigned to the pixel.

If at step 226, the gradient magnitude value for a pixel is found to exceed the threshold value T, the pixel intensity is multiplied by a factor "b", as noted at step 234. The resulting product is then added at step 236 to the product of the raw intensity for that pixel and a multiplier equal to "1−b" determined at step 238. In the present embodiment, the value of "b" may be set within a range from 0 to 1, with the value of "a" being set equal to 1.5 times the value of "b". As will be apparent to those skilled in the art, the weighted averaging performed by the steps summarized in FIG. 15 effectively adds texture back to non-structural regions to provide understandable environment for the structure filtered as described above. By performing the comparison at step 226, the process effectively adds less original texture for pixels having low gradient values, and more original texture for pixels having higher gradient values. Where desired, the values of "a" and "b" may be set so as to increase or decrease this function of the process.

What is claimed is:

1. A method for enhancing a discrete pixel image, the method comprising the steps of:
   (a) smoothing image data representative of pixels of a reconstructed image;
   (b) identifying structural features from the smoothed image data resulting from (a) and generating a mask representative based on the structural identification;
   (c) orientation smoothing the structural features;
   (d) homogenization smoothing non-structural regions;
   (e) orientation sharpening the structural features;
   (f) blending texture from non-structural regions of the image data into data processed in accordance with the foregoing steps.

2. The method of claim 1, wherein the structural features are determined based upon a scaled threshold value.

3. The method of claim 2, wherein the scaled threshold value is computed based upon an initial threshold value and a scaling factor input by a user.

4. The method of claim 1, wherein in step (b) the structural features include pixels having values below a first threshold value but above a second, lower threshold value, and positioned adjacent to a structural pixel.

5. The method of claim 1, wherein step (c) includes dominant orientation smoothing pixels based upon a dominant orientation and an orientation orthogonal to the dominant orientation.

6. The method of claim 5, wherein dominant orientation smoothing is performed based upon a predetermined relationship between a characteristic of each structural pixel in the dominant orientation and in the orthogonal orientation.

7. The method of claim 6, wherein the characteristic is a number of counts of orientations within a neighborhood of each structural pixel.

8. The method of claim 1, wherein step (e) is performed only for structural pixels having a value above a desired lower limit value.

9. A method for enhancing a discrete pixel images, the method comprising the steps of:
   (a) identifying structural features from discrete pixel image data based upon a user selected scaling factor applied to a predetermined threshold value and Generating a mask representative based on the structural identification;
   (b) orientation smoothing the structural features;
   (c) homogenization smoothing non-structural regions;
   (d) orientation sharpening the structural features; and
   (e) blending texture from non-structural regions of the image data into data processed in accordance with the foregoing steps.

10. The method of claim 9, comprising the further step of smoothing the image data prior to identifying the structural features.

11. The method of claim 9, wherein the structural features include pixels having values below a first threshold value but above a second, lower threshold value, and positioned adjacent to a structural pixel.

12. The method of claim 9, wherein step (b) includes dominant orientation smoothing pixels based upon a dominant orientation and an orientation orthogonal to the dominant orientation.

13. The method of claim 12, wherein dominant orientation smoothing is performed based upon a predetermined relationship between a characteristic of each structural pixel in the dominant orientation and in the orthogonal orientation.

14. The method of claim 13, wherein the characteristic is a number of counts of orientations within a neighborhood of each structural pixel.

15. The method of claim 9, wherein step (d) is performed only for structural pixels having a value above a desired lower limit value.

16. A method for enhancing a discrete pixel images, the method comprising the steps of:
    (a) identifying structural features from discrete pixel image data, the structural features including pixels having values above a first threshold and pixels having values below the first threshold value but above a second, lower threshold value and positioned adjacent to a first pixel, and generating a mask representative of the structural features based on the structural identification;
    (b) orientation smoothing the structural features;
    (c) homogenization smoothing non-structural regions;
    (d) orientation sharpening the structural features; and
    (e) blending texture from non-structural regions of the image data into data processed in accordance with the foregoing steps.

17. The method of claim 16, wherein first threshold is based upon a scaling factor selected by a user.

18. The method of claim 16, wherein step (b) includes dominant orientation smoothing pixels based upon a dominant orientation and an orientation orthogonal to the dominant orientation.

19. The method of claim 18, wherein dominant orientation smoothing is performed based upon a predetermined relationship between a characteristic of each structural pixel in the dominant orientation and in the orthogonal orientation.

20. The method of claim 16, wherein the characteristic is a number of counts of orientations within a neighborhood of each structural pixel.

21. The method of claim 16, wherein step (d) is performed only for structural pixels having a value above a desired lower limit value.

22. A method for enhancing a discrete pixel image, the method comprising the steps of:
    (a) identifying structural features from discrete pixel image data and generating a mask representative based on the structural identification;
    (b) orientation smoothing the structural features based upon a dominant orientation for each pixel and an orientation orthogonal to the dominant orientation;
    (c) homogenization smoothing non-structural regions;
    (d) orientation sharpening the structural features; and
    (e) blending texture from non-structural regions of the image data into data processed in accordance with the foregoing steps.

23. The method of claim 22, comprising the further step of smoothing the image data prior to identifying the structural features.

24. The method of claim 22, wherein the structural features are determined based upon a scaled threshold value.

25. The method of claim 24, wherein the scaled threshold value is computed based upon an initial threshold value and a scaling factor input by a user.

26. The method of claim 22, wherein in step (a) the structural features include pixels having values below a first threshold value but above a second, lower threshold value, and positioned adjacent to a structural pixel.

27. The method of claim 22, wherein dominant orientation smoothing is performed based upon a predetermined relationship between a characteristic of each structural pixel in the dominant orientation ad in the orthogonal orientation.

28. The method of claim 27, wherein the characteristic is a number of counts of orientations within a neighborhood of each structural pixel.

29. The method of claim 22, wherein step (d) is performed only for structural pixels having a value above a desired lower limit value.

30. A system for enhancing a discrete pixel image, the system comprising:
    an output device for producing a reconstructed image based upon processed image data; and
    a signal processing circuit configured to provide processed image data by smoothing image data representative of pixels of the reconstructed image, identifying structural features from the smoothed image data and generating a mask representative based on the structural identification, orientation smoothing the structural features, homogenization smoothing non-structural regions; orientation sharpening the structural features, and blending of texture from non-structural region of the image data into data processed in accordance with the foregoing processing.

31. The system of claim 30, further comprising an image data acquisition system for producing image data signals processed by the signal processing circuit.

32. The system of claim 31, wherein the image data acquisition system includes a magnetic resonance scanner.

33. The system of claim 30, wherein the structural features are determined based upon a scaled threshold value.

34. The system of claim 33, wherein the scaled threshold value is computed based upon an initial threshold value a scaling factor input by a user.

35. The system of claim 30, wherein in the structural features include pixels having values below a first threshold value but above a second, lower threshold value, and positioned adjacent to a structural pixel.

36. The system of claim 30, wherein the dominant orientation smoothing is based upon a dominant orientation and an orientation orthogonal to the dominant orientation.

37. The system of claim 30, wherein dominant orientation smoothing is performed based upon a predetermined relationship between a characteristic of each structural pixel in the dominant orientation and in the orthogonal orientation.

38. The system of claim 37, wherein the characteristic is a number of counts of orientations within a neighborhood of each structural pixel.

39. The system of claim 30, wherein the sharpening is performed only for structural pixels having a value above a desired lower limit value.

* * * * *